US008676767B2

(12) United States Patent
Knox et al.

(10) Patent No.: US 8,676,767 B2
(45) Date of Patent: Mar. 18, 2014

(54) REAL TIME XML DATA UPDATE IDENTIFICATION

(75) Inventors: Richard Ian Knox, Lochwinnoch (GB); David William Morton, Glasgow (GB)

(73) Assignee: International Business Machines Corporation, Armonk, NY (US)

( * ) Notice: Subject to any disclaimer, the term of this patent is extended or adjusted under 35 U.S.C. 154(b) by 3169 days.

(21) Appl. No.: 10/662,009

(22) Filed: Sep. 11, 2003

(65) Prior Publication Data

US 2004/0181561 A1   Sep. 16, 2004

(30) Foreign Application Priority Data

Mar. 14, 2003 (GB) .................................. 0305828.6

(51) Int. Cl.
*G06F 17/00* (2006.01)
(52) U.S. Cl.
USPC .......................................... 707/687; 707/697
(58) Field of Classification Search
USPC .......... 707/202, 203, 201, 687–704; 395/600; 709/310, 224; 711/161–163
See application file for complete search history.

(56) References Cited

U.S. PATENT DOCUMENTS

| 5,475,753 | A | * | 12/1995 | Barbara et al. | ................. | 713/187 |
| 5,479,654 | A | * | 12/1995 | Squibb | ........................ | 707/695 |
| 6,101,507 | A | * | 8/2000 | Cane et al. | ............. | 707/999.201 |
| 6,529,917 | B1 | * | 3/2003 | Zoltan | ................................ | 1/1 |
| 6,609,184 | B2 | * | 8/2003 | Bradshaw et al. | ............ | 711/162 |
| 6,640,317 | B1 | | 10/2003 | Snow | | |
| 6,668,260 | B2 | * | 12/2003 | Zoltan | ......................... | 707/610 |
| 6,732,122 | B2 | * | 5/2004 | Zoltan | ......................... | 707/610 |
| 6,886,131 | B1 | | 4/2005 | Kusama et al. | | |
| 6,996,585 | B2 | * | 2/2006 | Lai et al. | ...................... | 707/695 |
| 7,647,552 | B2 | | 1/2010 | Wan | | |
| 2001/0056504 | A1 | * | 12/2001 | Kuznetsov | ................... | 709/310 |
| 2002/0129042 | A1 | * | 9/2002 | Bradshaw et al. | ............ | 707/200 |
| 2003/0023718 | A1 | * | 1/2003 | Smith, II | ....................... | 709/224 |

OTHER PUBLICATIONS

Apweiler, et al., "Proteome Analysis Database: Online Application of InterPro," Nucleic Acids Research, vol. 29, No. 1, 2001, pp. 44-48.

* cited by examiner

*Primary Examiner* — Wilson Lee
(74) *Attorney, Agent, or Firm* — Steven M. Greenberg, Esq.; CRGO Law

(57) ABSTRACT

A data file comprising a plurality of blocks of data may have two or more versions. The meaning of the data file is insensitive to the ordering of the blocks of data within the data file. Updates to the data file may be identified by providing each of said plurality of blocks of data with a first checksum and each of said versions of the data file with a second checksum of the said version of the data file as a whole. The second checksum of the first version of the data file is compared with the second checksum of the second version of the data file. If the comparison indicates that the second checksums of the first and second versions of the data file differ, then the first checksums of each of said plurality of blocks of data of the first and second versions of the data file are compared and an indication is provided of which of the plurality of blocks of data differs between the first and second versions of the data file.

10 Claims, 1 Drawing Sheet

REAL TIME XML DATA UPDATE IDENTIFICATION

TECHNICAL FIELD

The present invention relates to the identification of updates to XML (extensible Markup Language) data and in particular to the identification of such updates in real time by a client.

BACKGROUND ART

The use of XML to represent data is well established—particularly to transport data between databases. The use of XML to display data to end-users is growing rapidly—mainly due to the development of XSL (eXtensible Stylesheet Language) Transforms which allow the XML data to be transformed into a format which is easy for a human to read (usually the target of an XSLT (XSL Transform) is HTML (HyperText Markup Language) or plain text). The XSLT can run as a server-side transform before the data are transmitted to the client, but, more often, the XML data are transformed inside a client browser which a) reduces the amount of data which is transmitted over the network link and b) off-loads processing work from the server.

The meaning of a particular piece of XML data is defined by the open and close tags which enclose it. Therefore the sequence <TAG>Data</TAG> can be considered as a data block. <TAG> is the open tag and marks the start of a particular piece of XML data. "Data" is data itself. </TAG> is the close tag and marks the end of a particular piece of XML data. The data section of a data block may contain one or more further data blocks meaning that data blocks can be nested to form a hierarchy. The physical order of the data blocks in the XML file is not usually meaningful—it is the hierarchical position of the data block (i.e. the list of all the tags which enclose it) which entirely defines the meaning of a particular piece of data. This means that data blocks in an XML file can be reordered without changing the overall meaning of the file. This makes it very difficult for a human to compare two XML files and notice any differences, even if the XML has been transformed into something which is more user-friendly (such as HTML which is displayed in a browser).

There are existing tools (such as DIFF) which compare two sets of flat text data and highlight any differences. DIFF identifies changes on a line-by-line basis but lines are not usually significant in XML: an entire XML file might contain only a single line. Even after it has been transformed, the data might not contain multiple lines (if the target of the transform is HTML) or the transformed data might display multiple data elements per line (for example, a spreadsheet). Merely highlighting a changed line is therefore of little value. Furthermore, these existing tools will highlight reordering as a change and therefore are of limited use on XML data (or transformed XML data) since they produce false highlights when XML blocks are reordered but the actual data meaning is unchanged. DIFF is a computationally intensive operation because it attempts to match up reordered lines and this requires intensive repeated comparison between the two versions of the data.

It would be desirable to have a simple method and apparatus for identifying an update between two versions of a data file having a plurality of blocks of data, the meaning of the data file being insensitive to the ordering of the blocks of data within the data file.

SUMMARY OF THE INVENTION

Accordingly, the present invention provides a method of identifying an update between a first version of a data file and a second version of a data file, the data file having a plurality of blocks of data, the meaning of the data file being insensitive to the ordering of the blocks of data within the data file, the method comprising: the steps of providing each of said plurality of blocks of data with a first checksum; providing each of said versions of the data file with a second checksum of the said version of the data file as a whole, said second checksum being insensitive to the ordering of the blocks of data within the data file; comparing the second checksum of the first version of the data file with the second checksum of the second version of the data file; responsive to said comparison indicating that the second checksum of the first version of the data file differs from the second checksum of the second version of the data file: comparing the first checksum of each of said plurality of blocks of data of the first version of the data file with the first checksum of each of said plurality of blocks of data of the second version of the data file; and providing an indication of which of said plurality of blocks of data differ between the first version of the data file and the second version of the data file.

The fact that the data file has a structure comprising a plurality of blocks of data is used so as to recognise whether or not the data content of the data file has changed even if the data blocks inside the data file have been reordered. The invention does not need to do a comparison of the whole of the data file and so it is particularly suitable for applications such as call-centres where a fast response is critical. The invention uses existing technology in a new way meaning that the required building blocks are already widely available. The invention is an improvement over the prior art because it only highlights the actual changed data to the user. The invention is far less computationally demanding because only the checksums on data blocks are compared and if no changes are detected, no further processing of the contents of the block is required. This makes this solution far more acceptable in circumstances where a fast response time is critical.

In a preferred embodiment, said first checksum is sensitive to the ordering of the data within a block of data. This allows the use of a checksum which is sensitive to even the smallest of changes in the data.

In a preferred embodiment, at least one of the blocks of data consists of a plurality of components and each of said plurality of components further comprises a third checksum.

Further preferably, the method further comprises the steps of selecting said third checksum from one of MD5 or a CRC algorithm; and combining said third checksum to provide said first checksum for each of the blocks of data using one of a 1-s complement sum or an XOR algorithm. This has the advantage that each of the components has a checksum that ensures that any change, however small in the component will generate a different checksum, whilst the checksum for the blocks of data is less computationally intensive.

In a particular embodiment, the data file is an XML data file and said step of comparing is performed using an XSL Transform.

The invention further provides apparatus for identifying an update between a first version of a data file and a second version of a data file, the data file having a plurality of blocks of data, the meaning of the data file being insensitive to the ordering of the blocks of data within the data file, the apparatus comprising: first checksum generating means for generating a first checksum for each of said plurality of blocks of data; second checksum generating means for generating a second checksum for each of said first and said second versions of the data file as a whole; first comparison means for comparing the second checksum of the first version of the data file with the second checksum of the second version of the data file; second comparison means for comparing the first checksum of each of said plurality of blocks of data of the first version of the data file with the first checksum of each of said plurality of blocks of data of the second version of the data file, the second comparison means being responsive to said first comparison means indicating that the second checksum of the first version of the data file differs from the second checksum of the second version of the data file: indication means providing an indication of which of said plurality of blocks of data differ between the first version of the data file and the second version of the data file.

The invention yet further provides a computer program comprising computer program code means adapted to perform the steps of the method described above.

BRIEF DESCRIPTION OF THE DRAWINGS

The invention will now be described, by way of example only, with reference to the accompanying drawings, in which.

DETAILED DESCRIPTION OF THE PREFERRED EMBODIMENT

Figure 1:
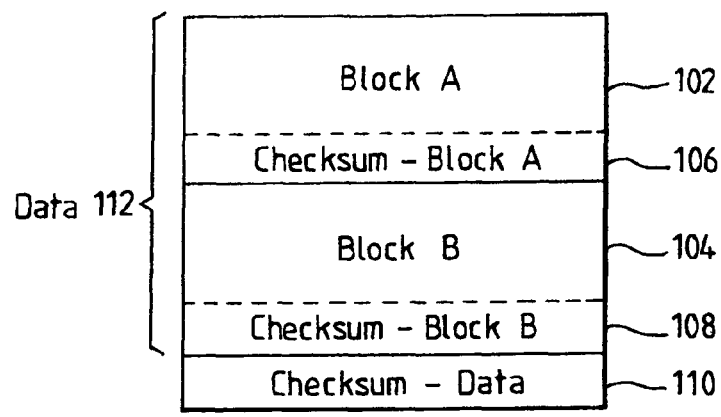
FIG. 1 shows a block diagram of data blocks and checksums according to the present invention.

FIG. 1 shows a block diagram of data blocks and checksums according to the present invention. Data 112 comprises multiple blocks of data 102, 104. Each block of data 102, 104 has an associated checksum 106, 108. The data 112 as a whole has a checksum 110 associated with it. The data blocks 102, 104 comprise data in which the physical order of the data blocks is not meaningful—it is the hierarchical position of the data block (i.e. the list of all the tags which enclose it) which entirely defines the meaning of a particular piece of data. Each of the data blocks may further comprise data subblocks, each data sub-block having an associated checksum. The present invention will now be described with reference to an embodiment using the XML language. However, the invention is equally applicable to any data file which comprises blocks of data where the meaning of the data file as a whole is insensitive to the ordering of the blocks of data.

Adding a checksum to each block of XML data 102, 104 makes it is possible to immediately identify whether or not the data 112 as a whole contains a change without having to examine all the data 112 and data blocks 102, 104 contained within the data 112 as a whole. Since the data block 102, 104 under investigation can be uniquely identified by its enclosing tags, it is simple to compare the checksum 106, 108 on the data block 102, 104 in question with the checksum 102, 104 on the corresponding data block 102, 104 in a different version of the file, even if the two XML files have different data block 102, 104 ordering. If a user decides to investigate the change in particular data blocks 102, 104 then checksums 106, 108 on the data blocks 102, 104 can be used to guide the user directly to the changed data. Since only the checksums 106, 108, 110 are compared, not the entire data 112, very little computation is required meaning that it is possible to do the checking real-time in a client-side transform. The transform can be written so that differences are highlighted using colour or font or some other method which draws the change to the user's attention without masking the underlying data content.

Figure 2:
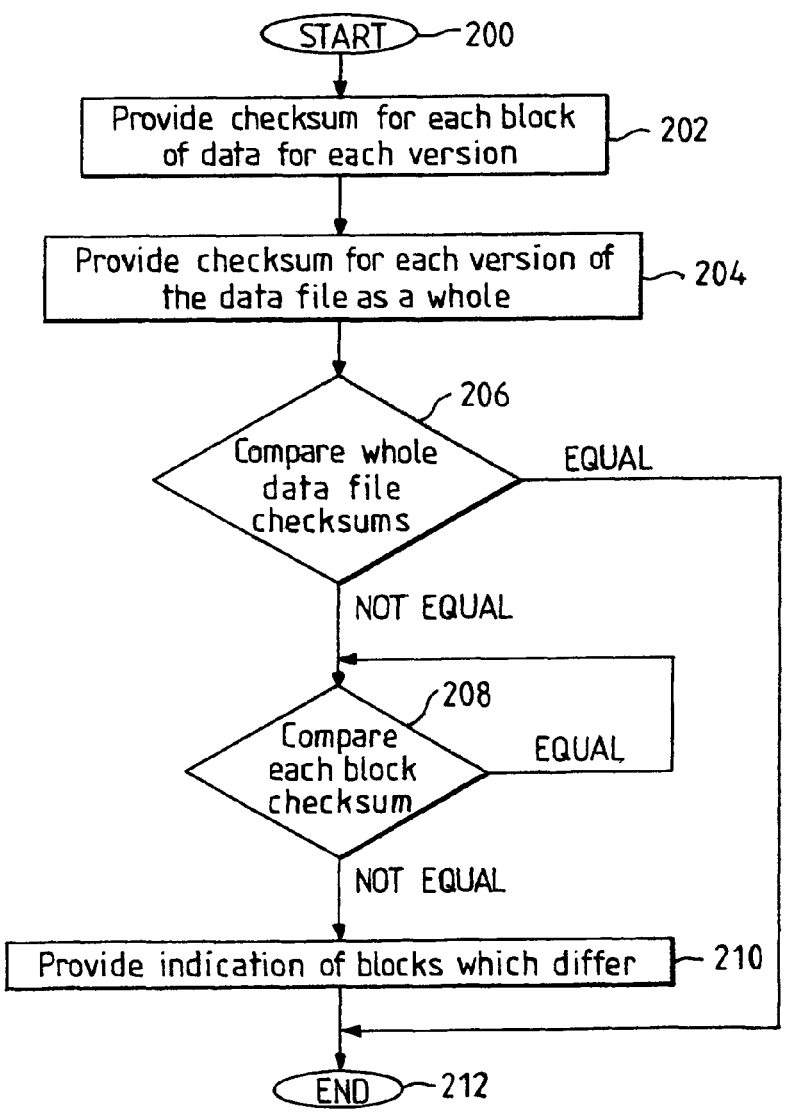
FIG. 2 shows a flow diagram of an embodiment of the present invention.

FIG. 2 shows a flow diagram of an embodiment of the present invention. A first version of a data file and a second version of a data file are to be compared to identify any updates between the two versions. Each of the data files has a plurality of blocks of data, the meaning of the data file being insensitive to the ordering of the blocks of data within the data file.

The embodiment starts at step 200. At step 202, a first checksum 106, 108, is provided for each of the plurality of blocks 102, 104 of data. At step 204, a second checksum 110 is provided for each of the versions of the data file as a whole.

At step 206, a comparison is made of the second checksum of each of the versions of the data file. If the second checksums of each of the versions of the data file are equal, then the comparison is complete and the first and second versions are identical and the embodiment proceeds to step 212 and ends. If the second checksums of each of the versions of the data file are not equal, then, at step 208, the first checksum of each of the plurality of blocks of data of each of the versions of the data file are compared with each other. For those blocks of data where the first checksum differs between corresponding blocks of data, an indication is provided, at step 210, of which of the plurality of blocks of data differ between the first and second versions of the data file. The embodiment then proceeds to step 212 and ends.

Consider the following two simple XML files which describes two versions of a product. A product consists of one or more subassemblies and a subassembly contains one or more components.

```
<?xml version="1.0" encoding="UTF-8" standalone="yes" ?>
<product id="computer">
  <subassembly id="motherboard">
    <component id="cpu">Pentium</component>
    <component id="memory">DIMM</component>
    <component id="video controller">S3</component>
    <chk>1234</chk>
  </subassembly>
  <subassembly id="power supply">
    <component id="transformer">50VA</component>
    <component id="connector">9pin D shell</component>
    <component id="fuse">13A</component>
    <chk>5678</chk>
  </subassembly>
  <chk>90AB</chk>
</product>
<?xml version="1.1" encoding="UTF-8" standalone="yes" ?>
<product id="computer">
  <subassembly id="power supply">
    <component id="connector">9pin D shell</component>
    <component id="fuse">5A</component>
    <component id="transformer">50VA</component>
    <chk>5690</chk>
  </subassembly>
  <subassembly id="motherboard">
    <component id="video controller">S3</component>
    <component id="cpu">Pentium</component>
    <component id="memory">DIMM</component>
    <chk>1234</chk>
  </subassembly>
  <chk>90CD</chk>
</product>
```

Note that the checksum in the second last line is different between the two files (90AB versus 90CD). This checksum 110 for the entire data 112 identifies that there is a difference between the two files without having to examine the entire contents of both of the files. Each block of data 102, 104 is now examined. Starting with the motherboard subassembly, both motherboards have the checksum 1234. This means that the data contained in the motherboard subassembly in both versions is the same, even though the components are ordered differently in the two versions of the file. The Power Supply subassembly is now examined and as can be seen the checksums are different (5678 versus 5690). Optionally, each component in the subassembly could have a separate checksum. In the example above, the component data is not long and complicated and so the data is best compared directly and a checksum at the component level is not necessary or desirable.

Comparing the component data of version 1.0 with that of version 1.1 shows that the 13A fuse has been changed for a 5A fuse. The transform to display this XML to a user represents the product as a tree with each subassembly as a branch. With the branches initially collapsed, the Power Supply branch is highlighted to indicate it contains a change. Expanding the Power Supply branch, the user can see that the 5A Fuse component is highlighted. Placing the mouse over the 5A fuse component brings up a tooltip message showing that the previous value was 13A fuse. The following XSL transform generates an HTML output file and uses indentation to represent the tree and highlights a change in any portion of the tree in red.

```
- <xsl:stylesheet
  xmlns:xsl="http://www.w3.org/1999/XSL/Transform"
    version="1.1">
    <xsl:output method="html" />
    <xsl:param name="oldFile" select="' 'product1.xml'" />
    <xsl:variable name="old" select="document($oldFile)"
/>
  - <xsl:template match="/">
    - <html>
      - <ul>
        <xsl:apply-templates />
        </ul>
      </html>
    </xsl:template>
  - <xsl:template match="product">
    + <li>
    </xsl:template>
  - <xsl:template match="subassembly">
      <xsl:param name="node" select="." />
    - <li>
      - <xsl:for-each select="$old">
        - <xsl:choose>
          - <xsl:when
test="./product[@id=$node/../@id]/subassembly
          [@id=$node/@id]/chk/text( ) =
$node/chk/text( )">
            - <font color="black">
              <xsl:value-of select="$node/@id" />
              </font>
            </xsl:when>
          - <xsl:otherwise>
            - <font color="red">
              <xsl:value-of select="$node/@id" />
              </font>
            </xsl:otherwise>
          </xsl:choose>
        </xsl:for-each>
      - <ul>
        <xsl:apply-templates />
        </ul>
      </li>
    </xsl:template>
  - <xsl:template match="component">
      <xsl:param name="node" select="." />
    - <li>
      - <xsl:for-each select="$old">
        - <xsl:choose>
          - <xsl:when
test="./product[@id=$node/../../@id]/subassembly
[@id=$node/../@id]/component[@id=$node/@id]/text( ) =
              $node/text( )">
            - <font color="black">
              <xsl:value-of select="$node/text( )" />
              </font>
```

-continued

```
            </xsl:when>
          - <xsl:otherwise>
            - <font color="red">
              <xsl:value-of select="$node/text( )" />
              </font>
            </xsl:otherwise>
          </xsl:choose>
        </xsl:for-each>
      </li>
    </xsl:template>
    <xsl:template match="chk" />
  </xsl:stylesheet>
```

The checksum algorithm used to generate the checksum 110 for the data 112 (the highest level) needs to be insensitive to any changes in the order of the data items 102, 104 (the lowest level) being checked. Examples are a simple exclusive OR of each of the data items being checked or a 1-s complement sum of the data items being checked. However, such a checksum may also be insensitive to some changes in the data that may be significant. In a preferred embodiment, different checksum algorithms are used for the checksum 106, 108 at a data block 102, 104 (lowest) level and for the checksum 110 for the data 112 (highest level) as a whole. At a component level (the lowest level), a checksum that is as sensitive as possible to any changes in the data, including changes in the order may be used. A cryptographic strength message digest algorithm such as MD5 is functionally ideal but is expensive to compute. A CRC algorithm is a good compromise. If there is an intermediate level, that is if a number of components (lowest level) make up a data sub-block (intermediate level) and a number of data sub-blocks (intermediate level) make up a data block (highest level), then at the lowest level (the component level), the checksum can be order sensitive, but the checksums at each of the other levels (intermediate level and highest level) must not be order sensitive.

The component level checksums may optionally not be saved as part of the XML data, but may instead be combined using an algorithm that is not sensitive to the order of the data items, such as a 1-s complement or an XOR algorithm. The combination of different checksum algorithms provides the advantage of easy and reliable identification of changes without being sensitive to the order of the data.

While the preferred embodiments have been described here in detail, it will be clear to those skilled in the art that many variants are possible without departing from the spirit and scope of the present invention.

What is claimed:

1. A method of identifying an update between a first version of a data file and a second version of the data file, the data file having a plurality of blocks of data, the meaning of the data file being insensitive to an ordering of the blocks of data within the data file, the method comprising the steps of:

providing each of said plurality of blocks of data with a first checksum;

providing each of said versions of the data file with a second checksum of the version of the data file as a whole, said second checksum being insensitive to the ordering of the blocks of data within the data file;

comparing the second checksum of the first version of the data file with the second checksum of the second version of the data file;

responsive to said comparison indicating that the second checksum of the first version of the data file differs from the second checksum of the second version of the data file, comparing the first checksum of each of said plurality of blocks of data of the first version of the data file with the corresponding first checksum of each of said plurality of blocks of data of the second version of the data file; and providing an indication of which of said plurality of blocks of data differ between the first version of the data file and the second version of the data file.

2. The method as claimed in claim 1 wherein said first checksum is sensitive to the ordering of the data within a block of data.

3. The method as claimed in claim 1 wherein at least one of the blocks of data consists of a plurality of components and each of said plurality of components further comprises a third checksum.

4. The method as claimed in claim 3 further comprising the steps of: selecting said third checksum from one of MD5 or a CRC algorithm; and combining said third checksum to provide said first checksum for each of the blocks of data using one of a 1-s complement sum or an XOR algorithm.

5. The method as claimed in claim 1 wherein the data file is an XML data file and said step of comparing is performed using an XSL Transform.

6. Apparatus for identifying an update between a first version of a data file and a second version of the data file, the data file having a plurality of blocks of data, the meaning of the data file being insensitive to an ordering of the blocks of data within the data file, the apparatus comprising:

a processor configured to perform generating a first checksum for each of said plurality of blocks of data;

generating means for generating a second checksum for each of said first and said second versions of the data file as a whole, said second checksum being insensitive to the ordering of the blocks of data within the data file;

comparing the second checksum of the first version of the data file with the second checksum of the second version of the data file;

comparing the first checksum of each of said plurality of blocks of data of the first version of the data file with the corresponding first checksum of each of said plurality of blocks of data of the second version of the data file, responsive to said comparison indicating that the second checksum of the first version of the data file differs from the second checksum of the second version of the data file;

providing an indication of which of said plurality of blocks of data differ between the first version of the data file and the second version of the data file.

7. Apparatus as claimed in claim 6 wherein said first checksum is sensitive to the ordering of the data within a block of data.

8. Apparatus as claimed in claim 6 wherein at least one of the blocks of data consists of a plurality of components and each of said plurality of components further comprises a third checksum.

9. Apparatus as claimed in claim 6 wherein: the third checksum is one of MD5 or a CRC algorithm; and further comprising: means for combining said third checksum to provide said first checksum for each of the blocks of data using one of a 1-s complement sum or an XOR algorithm.

10. Apparatus as claimed in claim 6 wherein the data file is an XML data file and said step of comparing is performed using an XSL Transform.

* * * * *